June 16, 1931.   J. DAVEY   1,809,889
RESILIENT TIRE FOR WHEELS
Filed April 15, 1930   3 Sheets-Sheet 1
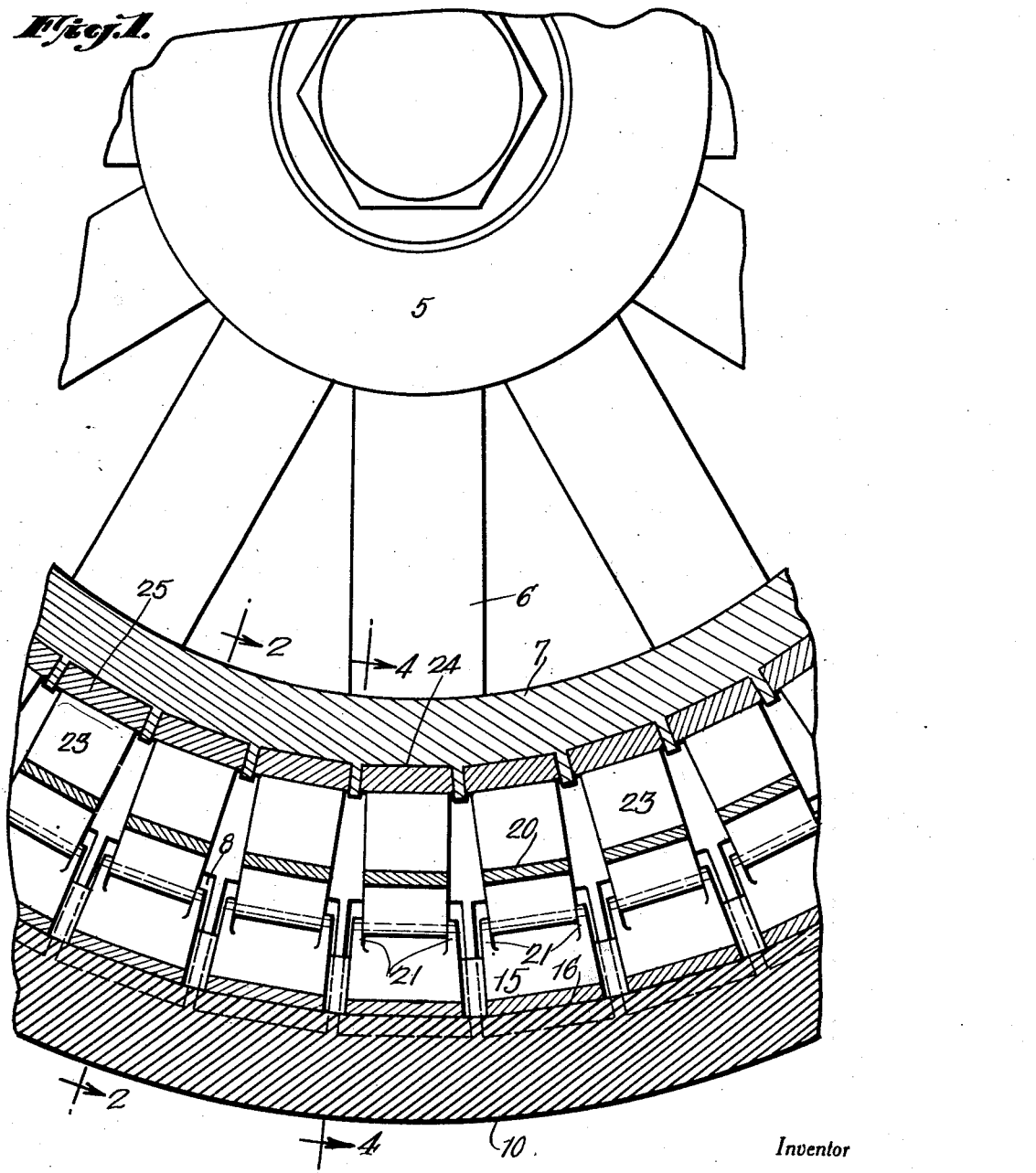
Inventor
JOSEPH DAVEY.
By Clarence A. O'Brien
Attorney

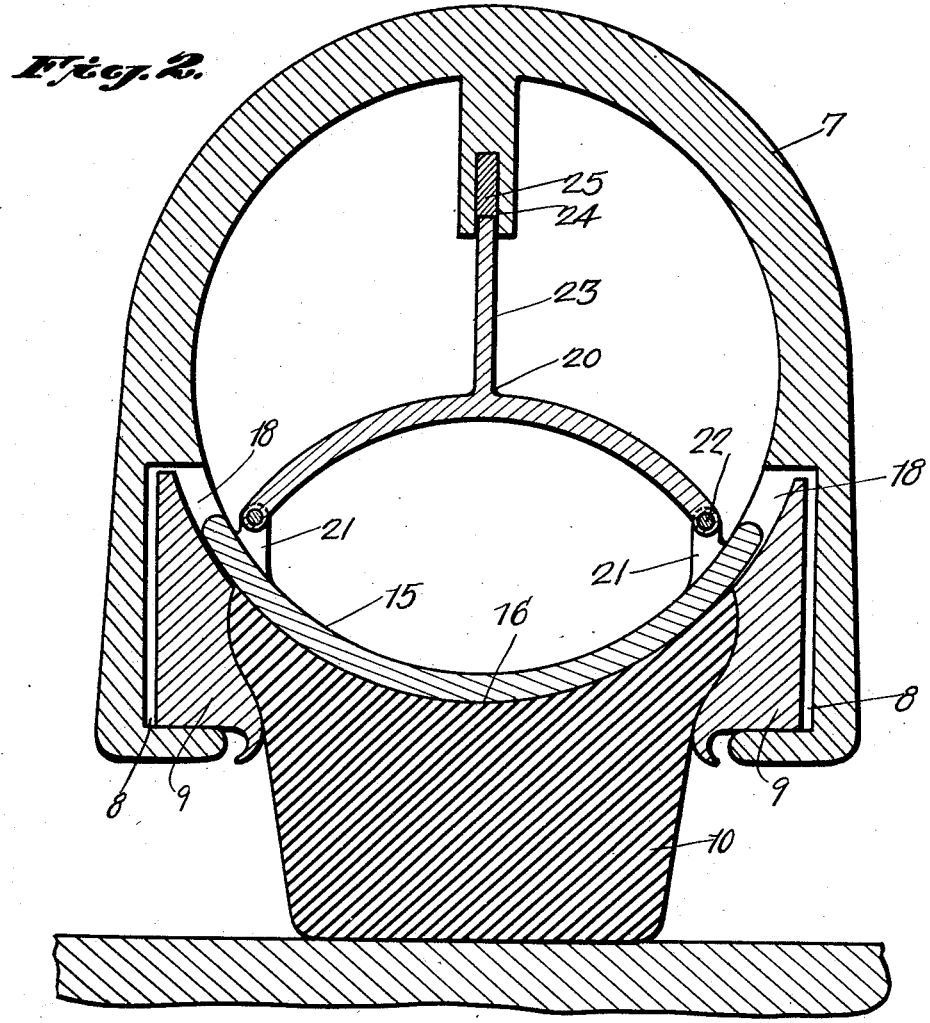
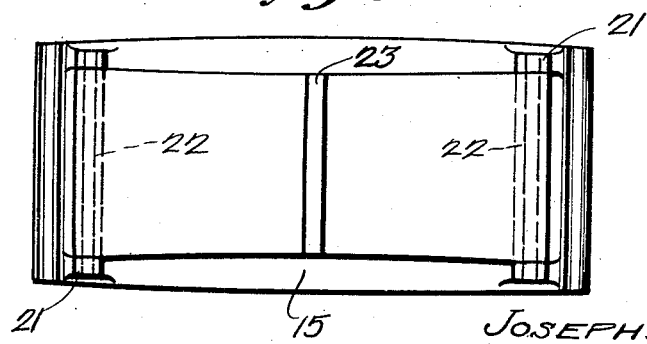

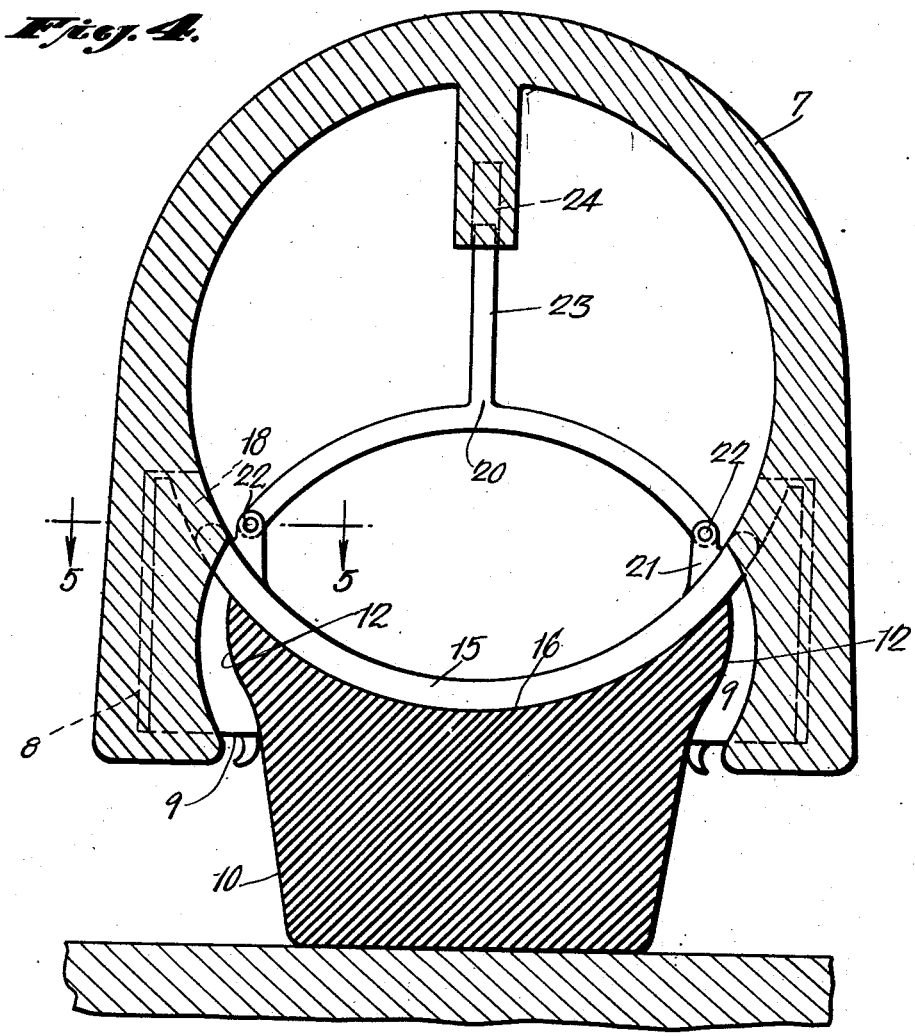
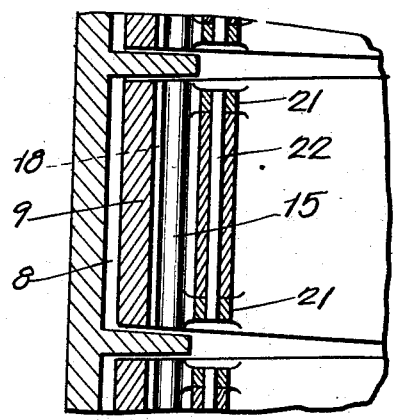

Patented June 16, 1931

1,809,889

UNITED STATES PATENT OFFICE

JOSEPH DAVEY, OF BELLE HARBOR, NEW YORK

RESILIENT TIRE FOR WHEELS

Application filed April 15, 1930. Serial No. 444,475.

This invention relates to improvements in resilient tires for wheels, and more particularly it pertains to that type of resilient tire known as cushion tires.

It is one of the objects of the invention to provide a construction by which the maximum amount of resiliency and cushioning effect may be obtained from a tire of the solid rubber type.

It is a further object of the invention, so to construct a cushion tire of the aforementioned character, that the tread surface thereof will be continuous as distinguished from those tires in which the tread consists of a plurality of separate shoes successively brought into engagement with the road surface by the turning of the wheel.

It is a further object of the invention, so to construct the tire that the tread member is a continuous circular rubber element which, when it is worn beyond further use may be replaced by a new member without any cost in addition to the cost of a new tire element like the worn tire element to be discarded.

With the above and other objects in view, reference is had to the accompanying drawings, in which:

Fig. 1 is a fragmentary view of a wheel, partly in circumferential section and showing a section of a tire attached hereto which tire is constructed in accordance with the present invention.

Fig. 2 is a detail sectional view taken on the line 2—2 of Fig. 1,

Fig. 3 is a plan view of one of the tire compressing elements,

Fig. 4 is a detail sectional view taken on the line 4—4 of Fig. 1, and;

Fig. 5 is a detail sectional view taken on the line 5—5 of Fig. 4.

Referring to the drawings by reference character, 5 indicates a wheel hub, 6, the spokes of the wheel, and 7 the felloe of the wheel. As will best be seen from Fig. 4, the felloe 7, is of circular cross section form and has an open side which construction provides a felloe member 7, which is of channel form. The side walls of the channeled felloe member are provided with a plurality of equidistantly spaced guide recesses 8 and mounted in each of said recesses 8, there is a block 9. These blocks 9 when in position in their respective recesses 8, are adapted to engage the sides of a tire or tread member 10. This tire or tread member 10 is preferably formed of rubber and is of the cushion type as distinguished from so called pneumatic types of tread members. That face of the blocks 9 which engages the side of the tread member 10 is preferably curved as indicated at 12, and the tire is preferably enlarged near its inner peripheral face to conform to the curved faces 12 of the several blocks 9.

The tread member 10 is preferably in the form of a circular band and is in its operative position carried with the channeled felloe member 7 with the guide blocks 9 engaging the side faces of the tread member. For supporting the tread member within the channeled member 7, there are a plurality of shoes 15 which are adapted for engagement with the inner peripheral face of the said tread member 10. These shoes are curved as best illustrated in Figure 4, and the inner peripheral face of the tread member 10 is transversely curved as indicated at 16 to conform to the curvature of the shoes 15. The ends of the shoe members 15 are extended beyond the sides of the tread member 10, and project into passages 18 formed in the side walls of the channeled member 7. These passages 18 form guides for the shoes 15, and prevent circumferential movement thereof relative to the wheel.

Secured to the rear or inner face of each of the tread engaging shoes 15, there is a substantially T-shaped member 20. These members are secured to the tread engaging shoes 15, preferably by pivotally connecting the ends of the cross arm of the T-members between lugs 21 preferably formed integral with the shoes 15, and securing the ends of the cross arm of the T-shaped members between said lugs by means of bolts or the like 22. The stem 23 of each of the T-shaped members, extends in the direction of the bottom of the channel of the channeled member, and projecting from the bottom of the channel of the channeled member, there is a plurality of spaced lugs or the like forming recesses 24 in which the free ends of the T-shaped members are received. Mounted in each of the recesses 24, there is a cushioned block 25 and the free end of the stem of the T-shaped members is adapted to engage with its respective cushion block 25 when the tread member is placed under compression, and the stem members moved towards the bottom or innermost walls of the recesses 24.

From the foregoing it will be apparent that each time the tread member is placed under compression at any particular point by means of the weight of the vehicle being transmitted thereto by the tread engaging shoe 15, the tread member will be compressed and will expand laterally moving the blocks 9 towards the rear of or laterally in their respective recesses 8. Also at this time, the T-shaped members 20 are moved inwardly or towards the bottom of the channel of the channeled member, and the stems 23 thereof place the cushioned blocks 25 under compression. Compression of the tread member 10 and the compression of the cushioned blocks 25 will provide sufficient cushioning effect, to insure smooth and easy riding of a vehicle to which such a wheel may be attached.

It is to be understood, that the invention is not to be limited to the specific form in which it is herein illustrated, but may be practiced in various other forms and constructions which rightfully fall within the scope of the appended claims.

What is claimed as new is:

1. A resilient wheel comprising a channeled felloe member, a resilient tire mounted in said channeled felloe member, guide recesses formed in the side walls of said channeled felloe member, and a plurality of tire supporting blocks carried by said channeled felloe member, said blocks being mounted in the recesses and having sliding movements laterally of the channeled member.

2. A resilient wheel comprising a channeled felloe member, a resilient tire mounted therein, guide recesses formed in the side walls of said channeled felloe member, and a plurality of tire supporting blocks carried by said channeled felloe member, said blocks being mounted in said recesses, said blocks having sliding movement in a direction transversely of said channel of said channeled felloe member and resisting lateral pressure of the tire.

3. A resilient wheel comprising a channeled felloe member, a resilient tire mounted in said channeled felloe member, tire supporting blocks mounted in the sides of the channeled felloe member, and engaging the sides of said tire, and tire compressing means projecting from the bottom of the channeled felloe member, and into engagement with the inner peripheral face of the tire, said last mentioned means comprising a plurality of tire engaging shoes, and means extending radially from each of said shoes, to the bottom of the channel of the channeled felloe member.

4. A resilient wheel comprising a channeled felloe member, a resilient tire mounted in said channeled felloe member, tire supporting blocks mounted in the sides of the channeled felloe member, and engaging the sides of said tire, and tire compressing means projecting from the bottom of the channeled felloe member, and into engagement with the inner peripheral face of the tire, said last mentioned means comprising a plurality of tire engaging shoes, and a T-shaped member secured at the ends of the cross arm to each of said shoes, and having its stem projecting to a point adjacent the bottom of said channeled felloe member, and guiding means for the free end of the stem of each of said T-shaped members.

5. A resilient wheel comprising a channeled felloe member, a resilient tire mounted in said channeled felloe member, tire supporting blocks mounted in the sides of the channeled felloe member, and engaging the sides of the tire, and tire compressing means projecting from the bottom of the channel of the channeled felloe member, and into engagement with the inner peripheral face of the tire, said last mentioned means comprising a plurality of tire engaging shoes, and a T-shaped member secured at the ends of its cross arm to each of said shoes, and having its stem projecting to a point adjacent the bottom of the channel of said channeled member, and guiding means for the free end of the stem of each of said T-shaped members, and cushioning means for each of the said T-shaped members.

6. A resilient wheel comprising a channeled felloe member, a resilient tire mounted in said channeled felloe member, tire supporting blocks mounted in the sides of the channeled felloe member, and engaging the sides of said tire, and tire compressing means projecting from the bottom of the channel of the channeled felloe member, and into engagement with the inner peripheral face of the tire, said last mentioned means comprising a plurality of tire engaging shoes, and a T-shaped member secured at the ends of the cross arm to each of said shoes, and having its stem projecting to a point adjacent the bottom of said channeled felloe member, guiding means for the free end of the stem of each of said T-shaped members, and cushioning means comprising a block of resilient material mounted in the guiding means, and adapted for engagement by the free end of the stem of its respective T-shaped member.

In testimony whereof I affix my signature.

JOSEPH DAVEY.